Figure 1:
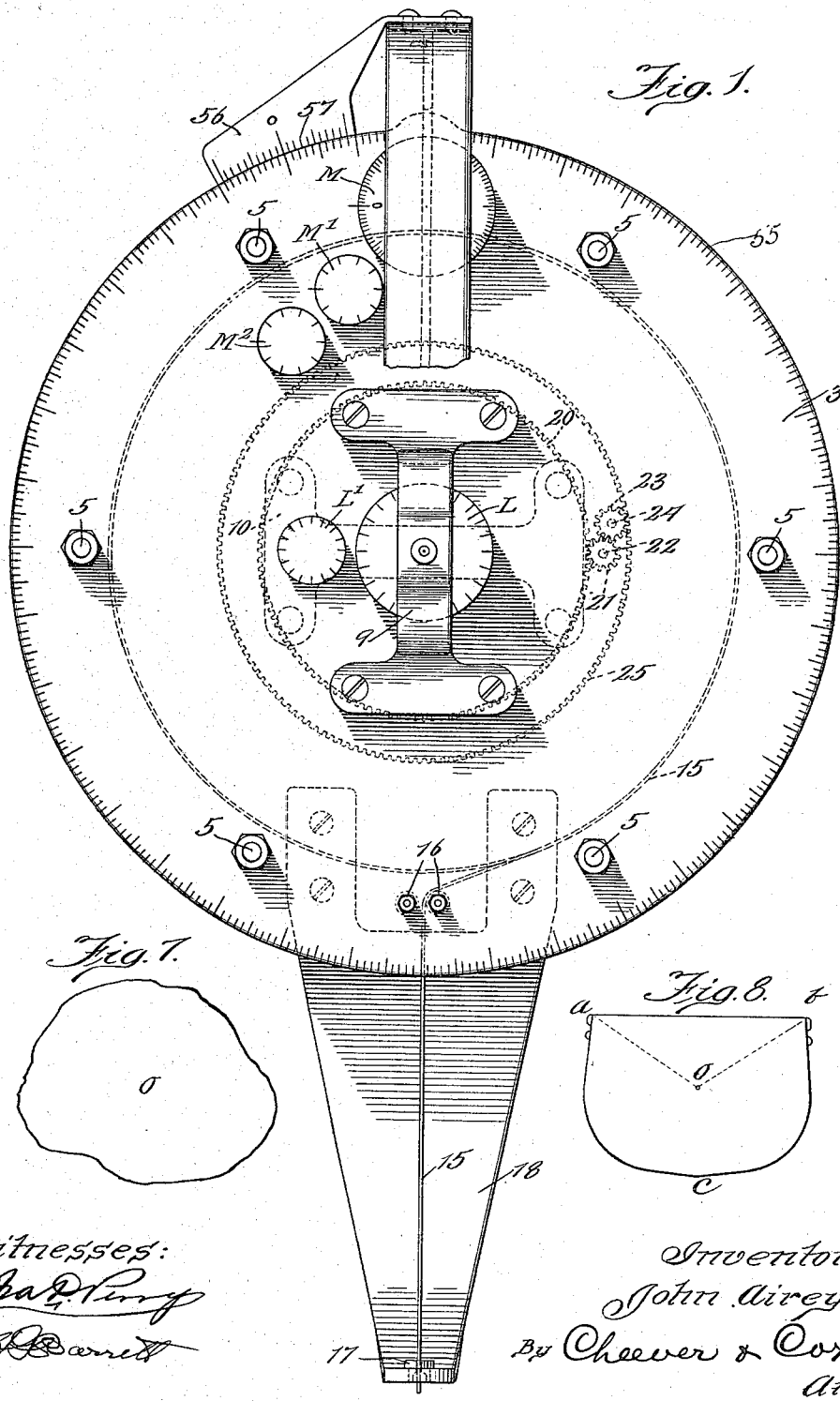

J. AIREY.
AREA METER.
APPLICATION FILED FEB. 26, 1915.

1,170,721.

Patented Feb. 8, 1916.
3 SHEETS—SHEET 1.

J. AIREY.
AREA METER.
APPLICATION FILED FEB. 26, 1915.

1,170,721.

Patented Feb. 8, 1916.
3 SHEETS—SHEET 2.

Witnesses:

Inventor:
John Airey
By Cheever & Cox
Attys

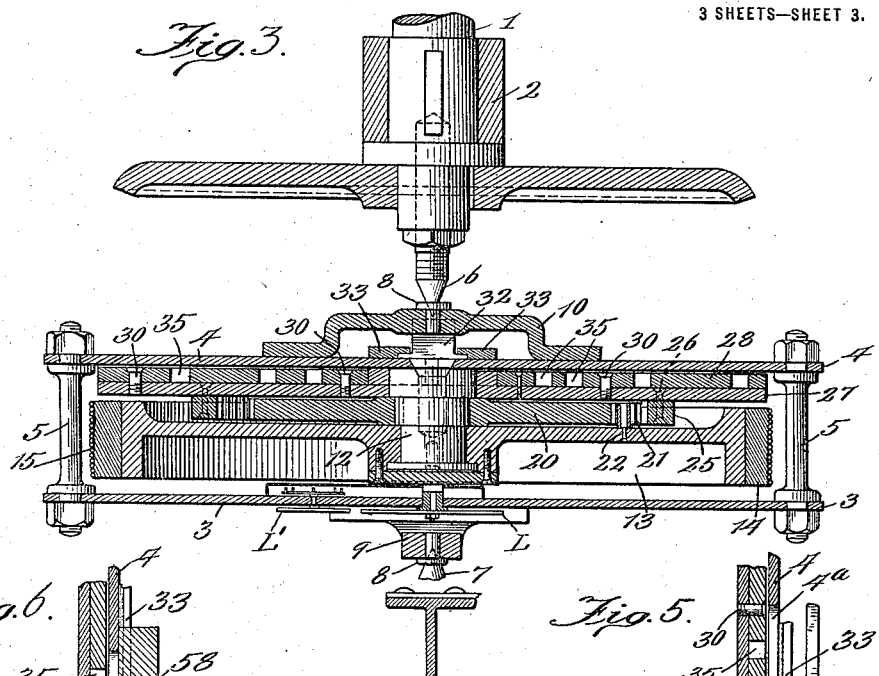
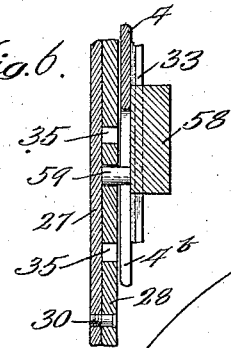
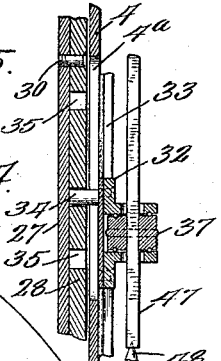
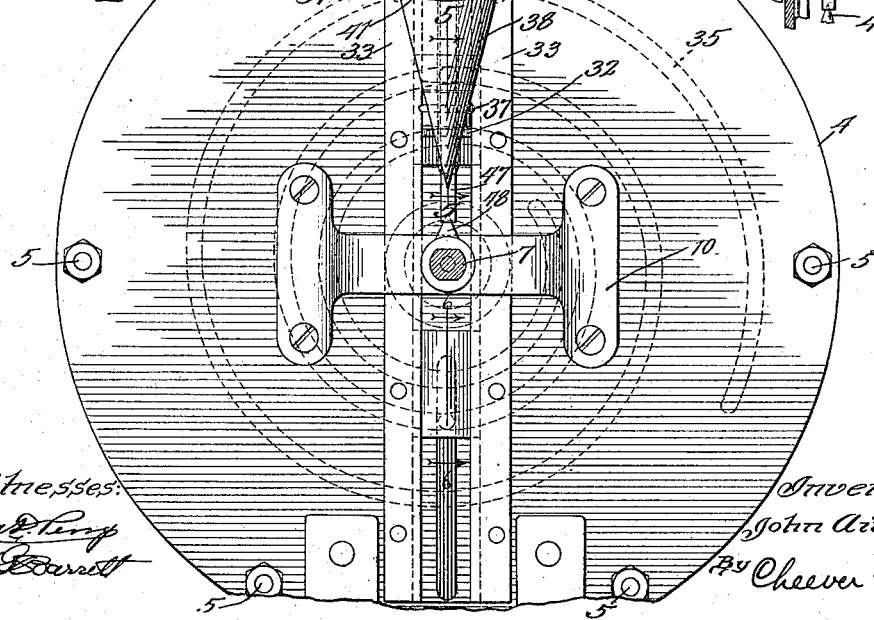

UNITED STATES PATENT OFFICE.

JOHN AIREY, OF ANN ARBOR, MICHIGAN.

AREA-METER.

1,170,721. Specification of Letters Patent. Patented Feb. 8, 1916.

Application filed February 26, 1915. Serial No. 10,685.

*To all whom it may concern:*

Be it known that I, JOHN AIREY, a subject of the King of Great Britain, residing at Ann Arbor, in the county of Washtenaw and State of Michigan, have invented a certain new and useful Improvement in Area-Meters, of which the following is a specification.

My invention relates to instruments known as planimeters, but with this difference, that whereas a planimeter is used on a small scale drawing of the original figure, and the successful action of the planimeter depends on a true, smooth, plain surface being provided by the drawing paper, my invention can be used in the field; that is, at the actual place where the area to be measured is located and does not require any smooth or specially prepared surface. All that is required is means for holding the instrument stationary while the measurement is being taken; and the instrument may be held either within or without the confines of the area to be measured. It can be used equally well for measuring areas in any plane from the vertical to the horizontal. As an example of vertical plane measurement may be mentioned a vertical sectional area of a railway cut or fill or an embankment or the areas of various vertical sections of the cargo space in ships' hulls. My device is applicable to areas both where the entire outline can be followed and where a part of the outline cannot be followed.

The general object of my invention is to provide a planimeter or aerameter having the above described characteristics.

Specific and contributory objects will become apparent as the description proceeds, and among these, special mention may be made of the means provided for automatically compensating for the sag of the wire and other disturbing factors.

Figures 2, 9, 10:
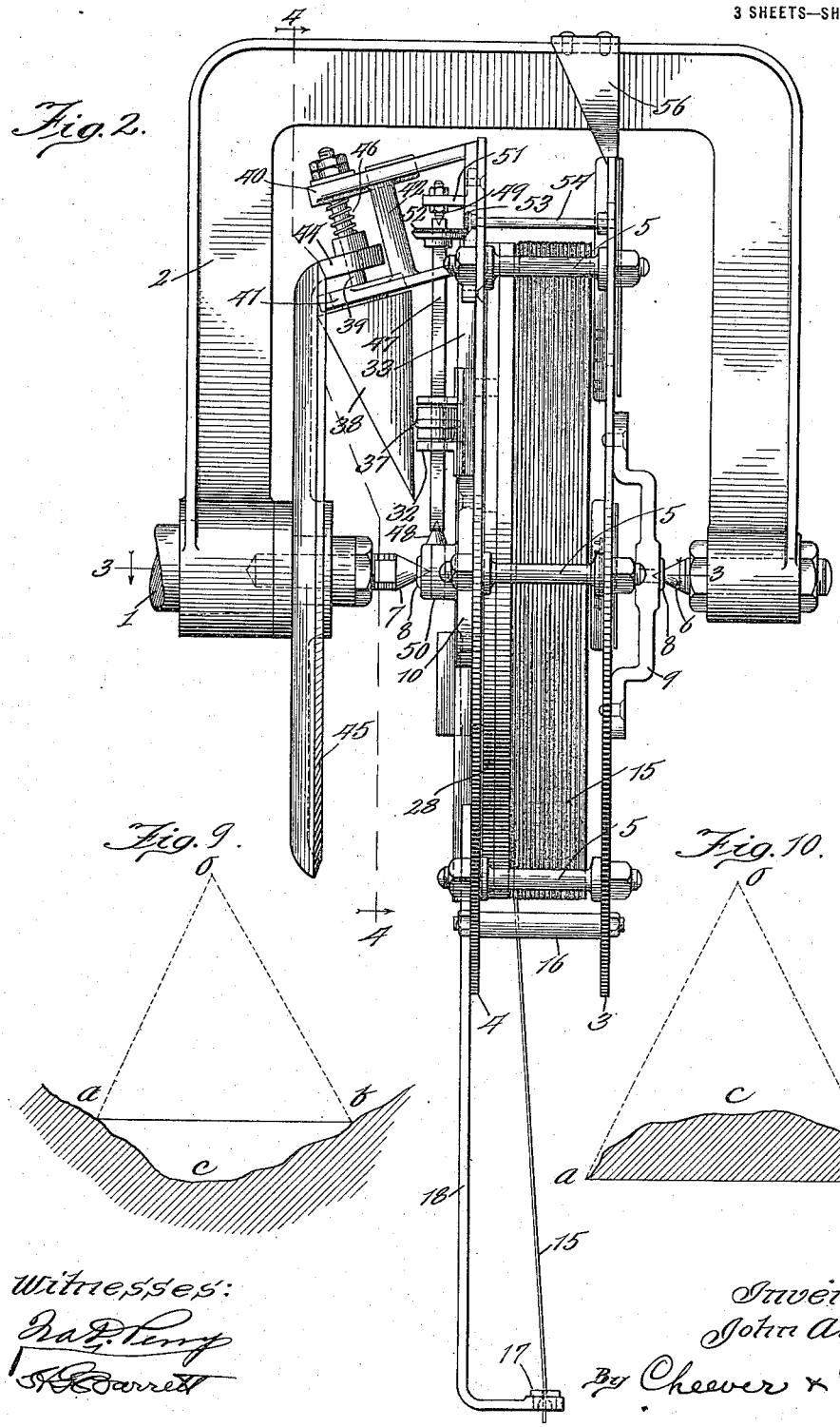

I accomplish my objects by the mechanism illustrated in the accompanying drawings, in which:

Figure 1 is a general face view of the instrument, having a fragment of the supporting frame work removed for better disclosing the location and arrangement of the parts. Fig. 2 is a side elevation of the instrument looking toward the right in Fig. 1. Fig. 3 is a plan section taken on the line 3—3, Fig. 2. Fig. 4 is a sectional elevation on the line 4—4, Fig. 2. Fig. 5 is a sectional detail taken on the line 5—5, Fig. 4. Fig. 6 is a sectional detail taken on the line 6—6, Fig. 4. Figs. 7, 8, 9 and 10 are diagrammatic views for explaining the manner of using the instrument.

Similar numerals refer to similar parts throughout the several views.

When in use, the shank 1 is held stationary and for this reason it will be convenient to refer to it as a stationary element. Rigidly attached to shank 1 is a main frame 2, which may also be regarded as stationary. Mounted within the main frame is a movable frame which supports, among other things, a reel, a reduction gear, a variable speed mechanism and means for controlling the latter. The movable frame is capable of oscillating about a center coincident with the axis of the reel, and means are provided, chiefly upon the movable frame, for indicating the angle to which the frame is oscillated, the length of wire unwound from the reel, and the amount of rotation transmitted through the reduction gear. These parts will now be described more in detail.

The movable or oscillatable frame is composed primarily of two members 3 and 4. In the form shown, these consist of disks arranged parallel to each other and rigidly held at a fixed distance apart by a set of studs 5. The outer face of the disk 3 is the one which is viewed by the observer in reading the instrument and hence it will be referred to as the front disk while its companion disk 4 will be referred to as the rear disk. The particular means shown in the drawings for pivotally supporting the oscillatable frame are the centers 6, 7 supported in the main frame 2 with their axes in line with each other and their points bearing in hardened cups 8, 8. Said cups are mounted in spiders 9, 10 fastened to the outer faces of the disks 3 and 4 respectively.

I will next describe, in the form chosen to illustrate the invention, the wire reel, the controlling cam and the transmission gearing through which the rotation of the reel is transmitted to the cam: A center stud 12 is screwed or otherwise rigidly fastened to the rear disk 4 in such position as to project toward the front disk 3 and have its axis in line with the axes of the centers 6, 7. Upon this stud is mounted a reel 13, the construction being such that the reel is freely rotatable upon the stud but is held against axial movement. By preference, the reel is provided with a peripheral shell 14 which is removable but ordinarily rigidly secured to the reel, and carries the measuring wire 15. Said wire is normally stored upon the wheel with the turns side by side, the free end of the wire passing off between a pair of guide rollers 16 and out through an eyelet 17 mounted at the outer end of an arm 18, extending radially for some distance beyond the edge of the disk 4. The removable shell 14 facilitates the replacing of the wire in case the latter becomes worn or broken, for to replace the wire it is only necessary to remove the shell, which, of course, is then free to be manipulated, whereas the reel itself has a limited amount of rotation and has a definite zero position.

The advantages in laying the turns of wire side by side instead of on top of each other as would be the case with a tape, is that by so doing the length of each complete turn is the same as the length of every other complete turn, and I thus eliminate a variable factor which would call for a correction.

Behind the reel 13 is a spur gear wheel 20 which is keyed or otherwise rigidly fastened to the stud 12. The teeth of wheel 20 mesh with a pinion 21 which is freely rotatable upon a stud 22 extending rearwardly from the reel as best shown in Figs. 1 and 3. Pinion 21 meshes with a pinion 23 which is freely rotatable upon a stud 24 extending rearwardly from the reel. Pinion 23 meshes with the teeth of an internal gear wheel or ring 25 which is fastened by studs 26 or otherwise to the front of a disk 27 which carries the cam 28. Said cam is here shown in the form of a disk and fastened to the back of disk 27 by studs 30, 30 or otherwise. Said disk 27 is freely rotatable upon center stud 12 but is held against axial movement thereon. From the foregoing it will be evident that the reel is connected to cam 28 by a planetary gear in such manner that when the reel is rotated upon its axis relatively to the movable framework, the cam will also be rotated relatively to the movable framework but at a greatly reduced speed and in the same direction as the reel.

The manner in which the cam affects the variable speed gear will now be explained: Behind the rear disk 4 is a traveling bracket or slide 32 which travels in guides 33 secured to the back of the disk. The guides are arranged radially, and the distance of the slide from the axis of the oscillatable frame is controlled by a pin 34 which passes through a slot 4ª in the rear disk 4 into the spiral groove or slot 35 of the cam 28. The parts are so constructed and arranged that the slide recedes from the axis of the oscillatable frame in proportion to the square of the amount of wire unwound from the reel. Slide 32 carries a roller 37 which is preferably mounted upon ball bearings and whose axis of rotation is radial to the axis of rotation of the oscillating frame and reel. Said roller makes frictional contact with a cone 38 rigidly attached to a spindle 39 which is coincident with the axis of the cone and is mounted in a bracket consisting, in the present design, chiefly of two arms 40, 41 connected by a cross brace 42 and fastened to the back of the rear disk. Rigidly fastened to spindle 39 is a wheel 44 which coöperates with a wheel 45 rigidly secured to the main frame work, coaxially with the oscillatable frame and reel. The wheels 44 and 45 are bevel gear wheels and may be in the form either of friction gears or toothed gears. It is evident that, the wheel 45 being stationary relative to the main frame, it will cause the gear wheel 44, spindle 39 and cone 38 to rotate whenever the oscillatable frame rotates in the stationary frame. It is also evident that the nearer the friction roller 37 is to the base of the cone the faster said roller will rotate. It is also evident that said roller is moved nearer the base as the wire is unwound. If desired a helical spring 46 may be placed around the spindle with one end abutting the inside of the bracket arm 40, and the other end abutting the back of the gear wheel 44 to hold wheel 44 in close contact with wheel 45 if a friction drive should be used; in this case wheel 44 would be splined to spindle 39.

Roller 37 has a square hole passing through it in a direction radial to the axis of the oscillatable frame as shown in detail in Fig. 5. A square shaft 47 passes through said hole, the roller being slidable freely lengthwise of the shaft but forcing said shaft to rotate in unison with the roller or a shaft with a long feather could be used if found desirable. Shaft 47 is mounted on delicate bearings which may be of any suitable type, the drawings showing the shaft to be cupped at the ends for receiving the points of two centers 48 and 49. According to the present design, the center 48 is located upon the hub 50 on the oscillatable frame while the center 49 is adjustably mounted in the bracket arm 51. A bevel gear wheel 52 is fastened upon shaft 47 in position to mesh with the bevel pinion 53 fastened to the shaft 54 journaled in the oscillatable frame outside of the periphery of the reel. Shaft 54 is the main shaft of a meter which is provided with a number of dials M, M', and M². The specific design of this meter is immaterial, it being sufficient for the present purpose to say that the readings express areas in accordance with whatever system of measurement is selected by the designers of the instrument. At the circumference of the front disk 3 is a scale 55, the graduations whereof pass adjacent to a pointer 56 fastened to the main frame 2 as best shown in Figs. 1 and 2. By preference said pointer is provided with graduations 57 forming a vernier for accurately reading the angle of inclination of the oscillatable frame. By reading the scale 55 at the beginning and end of the oscillatory movement of said frame it is possible to measure the angle swept through by the wire 15 in taking the measurement. A register having dials L, L' is arranged upon the face of the disk 3 for indicating the length of wire out from the instrument. The specific construction of this register is immaterial, it being sufficient to say that it is actuated by the reel and the dials L, L' express lengths in accordance with the selected system of measurement.

When the instrument is held with its axis horizontal and a considerable length of wire is out—as it will frequently be in measuring railway cuts and fills and similar objects for which the device is intended, gravity, acting upon the wire, will tend to cause it to sag and the wire arm 18 to droop to an extent which would introduce a material error into the readings of the instrument. The weight of the variable speed gearing mounted on the oscillatable frame on the opposite side of the axis tends to elevate the wire arm as it moves outward. To compensate both of the above, viz., the sag of the wire and the movement of the variable speed gearing, I have provided a compensating mechanism which I will now explain: The guides 33 on the back of the disk 4 are extended toward and considerably beyond the axis of rotation of the oscillating frame and serve to guide a counterweight 58 which has a pin 59 passing through a radial slot $4^b$ in the disk 4. Said pin projects into the groove or cam track 35 in the cam 28 as shown in detail in Fig. 6. It is evident that as a result of this construction the counterweights will mutually approach or recede from the axis but at varying rates. The weight of the counter balance 58 is so proportioned as to take into consideration the distribution of all of the parts, and the result is that the factors tending to create error are compensated for and the wire arm 18 always points directly toward the end of the wire irrespective of the length of or tension in the wire, or inclination of wire to horizontal.

Operation: In describing the method of using the instrument it is convenient to divide the cases into two classes: (a) In which the complete circuit can be traced as in measuring a plot of land or the cross section of a ship's hull. (b) In which the circuit cannot be quite completed, the part required to close the circuit, which for some reason cannot be traversed, being a straight line, as in a railroad embankment where it is impossible to follow the imaginary straight line connecting one side of the base with the opposite side of the base. In order to illustrate these cases I have made some diagrams, Figs. 7, 8, 9 and 10. Fig. 7 is intended to represent the contour of a plot of land or the shore line of a pond, the superficial area of which is to be measured. Fig. 8 represents a cross section of a ship's hull, the area of which section is to be determined. Fig. 9 represents a valley, the cross sectional whereof is desired to be determined up to an imaginary base line $ab$. Fig. 10, represents a cross section of a hill or embankment where the problem is to determine the cross sectional area as far as down the imaginary base line $ab$.

Now referring to the case $a$ where it is possible to follow the complete contour of the area to be measured: The operator mounts the instrument at some point within or without the area, the shank 1 and main frame 2 being held rigid and in such position that the axis of the oscillatable frame and of the reel will be vertical and the outer face of the disk 3 upward. Let it be assumed that the instrument is located at the point $o$, within the area. The end of the wire is taken and pulled until it touches some point in the contour of the said area. The area dials M, M', $M^2$ are then read; the end of the wire is then taken around the contour until it arrives again at the same point (that is, the circuit is completed) and said dials are then again read, the difference in the two readings giving the area within the contour.

In case (b) the instrument may be held, either within or without the area as convenient. Let us consider the conditions shown in Fig. 8 where the line $acb$ represents the cross section of a ship's hull. Let it be assumed that the instrument is placed at the point $o$ within the hull. The shank 1 will be rigidly fastened at this point with its longitudinal axis horizontal. The operator first takes the end of the wire to the point $a$ and notes the readings on the angle register 56 and on the dials M, M', $M^2$, of the area register and the dials L, L' of the distance register. He then traces the inner surface of the hull passing down from point $a$, thence across the bottom and up the opposite side to the point $b$. He then takes another reading of all of the registers. By subtracting the original reading of the area dials M, M', $M^2$ from the final reading thereof the operator obtains direct the area of the figure $oacb$. The two readings of the length dials L, L', will give him the length of the line $oa$ and the line $ob$ respectively. By reading the angle indicator 55, 56 he is able to determine the angle $aob$. As the operator now has the length of the two sides $oa$ and $ob$ and the magnitude of the included angle he can readily compute the area of the triangle *aob* and to this he will add the area *oacb* which he has just determined by reading the dials M, M', M². The sum of these two areas is of course equal to the area *acb*.

By analogy, the method to be employed in connection with the measurement of fills and cuts shown respectively in Figs. 9 and 10 will be readily perceived. The operator in the case of the fill shown in Fig. 9 will place the instrument at the point *o* and with the end of the wire trace the contour line *b*. Subtracting the initial from the final readings on the register dials M, M', M², will give him the total area *oacb* and from this he will subtract the area of the triangle *oab*, the remainder representing the area *acb*. In the case of the cut shown in Fig. 10 the operator will first ascertain the area *oacb* and also compute the area of the triangle *oab*. By subtracting the former from the latter he will obtain the area *acb*.

From the foregoing it will be seen that with the aid of my instrument, in cases where the entire contour can be followed the area may be obtained by simply noting and subtracting one from the other two register readings, the same to be taken from the dials M, M', M². In other cases the area to be measured may be determined in the same manner except that there must be added or subtracted the area of a triangle of which two sides and the included angle are known, the information being read from the instrument at the same time that the other dial readings are taken.

It is evident that by using my instrument the labors of the surveyor are reduced to a minimum. A single setting of the instrument is all that is required in any case and the instrument operates as well in cases where the closing or base line cannot be traversed as in cases where it can be traversed. The instrument itself is small and compact and is therefore light in weight and can be easily carried.

It will be understood that the details of construction of the instrument may be varied considerably without departing from the spirit of the invention. For example while I prefer to use a round thin wire as a distance measuring element, and prefer to coil this in the form of a helix on the reel (that is, with the turns side by side) a flat tape might be substituted; and by allowing for the variation in diameter, the tape may be wound up one turn on top of another.

Having thus described my invention, what I claim as new and desire to secure by Letters Patent, is:

1. An area measuring instrument having a register, an angularly movable element, an element movable radially with reference to said angularly movable element, and means whereby said elements coöperate to operate said register, said radially movable element being also angularly movable and by its change in direction changing the angular position of said angularly movable element.

2. An area measuring instrument having a pivotally supported element, a radially movable element movable approximately toward and from the same, and a register operated jointly by said pivotally supported and radially movable elements, said radially movable element being also angularly movable and in its angular movement moving said pivotally supported element about its pivot.

3. In an area meter, a stationary support, a radially movable member movable toward and from the same, an angularly movable member upon said support, and a register operated jointly by said radially movable and angularly movable members, said radially movable member being also angularly movable and engaging said angularly movable member to move it angularly, when said radially movable element moves angularly.

4. In a device for measuring areas, a register, a flexible longitudinally movable element and an angularly movable element, all connected together for operating said register, said longitudinally movable element being also angularly movable and engaging said angularly movable element to move it angularly when said longitudinally movable element is moved angularly.

5. An instrument for measuring areas having a register, a longitudinally movable element movable longitudinally toward and from the register and also movable angularly, and a rotatable element rotated by the angular movement of said longitudinally movable element, said rotatable and longitudinally movable element coöperating with each other and with the register.

6. A measuring instrument having a main frame, an oscillatable frame rotatably mounted therein, a rotary element mounted in said oscillatable frame coaxially therewith, a longitudinally movable element rotating said rotary element as it moves longitudinally, said longitudinally movable element being angularly swingable and engaging said oscillatable frame to oscillate it about its axis, and an area register mounted on said oscillatable frame and means whereby said register is operated in common by said rotary element and said oscillatable frame.

7. A measuring instrument having a main frame, an oscillatable frame rotatably mounted therein, a reel mounted in said oscillatable frame coaxially therewith, a flexible element winding onto and off of said reel, said flexible element being laterally swingable and engaging said oscillatable frame to rotate the same about its axis, an area register mounted on said oscillatable frame, and a variable speed gear for actuating said register, said gear being actuated by said oscillatable frame in sweeping through an angle, and the velocity ratio of said gear being determined by the distance said reel has rotated from zero position.

8. A measuring instrument having a stationary support, a frame rotatably mounted therein, a reel associated with said frame, a flexible element winding onto and off of said reel, the free portion of the flexible element being swingable through an angle and engaging the frame to rotate it about its axis, a register mounted on said frame, and a variable speed gear whose velocity ratio is determined by said reel, and means whereby said gear is actuated by the rotation of said frame about its axis.

9. A measuring instrument having a stationary support, a frame rotatably mounted therein, a reel, a flexible element winding onto and off of said reel, and being laterally swingable and engaging said frame to rotate it in harmony with the lateral swing of the flexible element, the unwound portion of said flexible element being longitudinally movable independently of said frame, a register, a variable speed gear for actuating said register, said gear being actuated by said frame in its rotation about its axis, a slide for varying the velocity ratio, and a cam for operating said slide, said cam being positioned by said frame.

10. An area measuring instrument having a register, an oscillatable frame actuating the same, a main frame in which the oscillatable frame is mounted, a reel mounted in the oscillatable frame, a flexible element winding onto and off of said reel, the angular position of the oscillatable frame about its axis depending upon the direction assumed by that portion of the flexible element external to the reel, the angular position of the reel about its axis determining the quantity of movement in the register compared with a given angular movement of the oscillatable frame.

11. In combination, a stationary support, a rotatable element carried thereby, a reel, a register operated in common by said reel and by said rotatable element, a flexible element winding onto and off from said reel, said flexible element being angularly movable and being connected to said rotatable element to thereby rotate said rotatable element when said flexible element is moved angularly.

12. An area measuring instrument having a stationary support, a rotatable element carried thereby, a reel also carried by said support, a register connected to and operated jointly by said reel and rotatable element, and a flexible element winding onto and off from said reel, said flexible element engaging said rotatable element to rotate it when the free portion of said flexible element is moved angularly.

13. A measuring instrument having a stationary support, a frame rotatably mounted thereon, a register mounted on said frame, two coöperating gear wheels, one on said support and one on said frame to produce motive power when said frame is rotated about its pivot, means for transmitting motion from the said gear wheel on the frame to said register, a cam for varying the velocity ratio of the transmission to said register, and an extensible element for operating said cam, said extensible element being angularly movable for rotating said frame about its pivot.

14. A measuring instrument having a stationary support, a frame rotatably mounted thereon, a register mounted on said frame, two coöperating gear wheels, one on said support and one on said frame to produce motive power when said frame is rotated about its pivot, means for transmitting motion from the said gear wheel on the frame to said register, a variable speed gear for transmitting motion from the said gear wheel on the frame to said register, a cam on said frame for controlling the velocity ratio of transmission to said register, and an extensible element for operating said cam, said extensible element being angularly movable for rotating said frame about its pivot.

15. A measuring instrument having a stationary support, a frame rotatably mounted thereon, a register mounted on said frame, two coöperating gear wheels one on said support and one on said frame to produce motive power when said frame is rotated about its pivot, means for transmitting motion from the said gear wheel on the frame to said register, a variable speed gear for transmitting motion from the said gear wheel on the frame to said register, a slide on said frame for varying the velocity ratio of transmission to said register, and a cam on said frame for controlling the position of said slide.

16. A measuring instrument having a stationary support, a frame rotatably mounted thereon, a register mounted on said frame, two coöperating gear wheels one on said support and one on said frame to produce motive power when said frame is rotated about its pivot, means for transmitting motion from the said gear wheel on the frame to said register, a variable speed gear for transmitting motion from the said gear wheel on the frame to said register, a slide on said frame for varying the velocity ratio of transmission to said register, a cam on said frame for controlling the position of said slide, and a reel mounted coaxially with said frame for determining the position of said cam.

17. A measuring instrument having a stationary support, a frame rotatably mounted therein, an area register on said frame, a reel mounted on said frame, a pair of gear wheels, one of which is fastened to the stationary support concentric with the axis of said frame, the other of said gear wheels being mounted on said frame remote from the axis thereof, a variable speed gear for transmitting to the register the motion of the gear wheel which is on said rotatable frame, and means operated by said frame in its rotation about its axis for determining the speed ratio of said variable gear.

18. A measuring instrument having a stationary support, an oscillatable frame journaled thereon, a register on said frame, a variable speed gear for actuating said register, motor mechanism for driving said gear, said motor mechanism including two coöperating elements, one of which is rotated by said oscillatable frame in proportion to the amount of rotation thereof about its axis, a reel, and means controlled by said reel for determining the velocity ratio of said variable speed gear.

19. A measuring instrument having a stationary support, an oscillatable frame journaled thereon, a register on said frame, motor mechanism which includes two coöperating elements one of which rotates in proportion to the amount of rotation of said oscillatable frame about its axis, a variable speed gear for operating said register, said variable speed gear including a cone and a friction roller which is adjustable relative to said cone, a register, a shaft geared to said register for actuating it, said roller being slidable along said shaft but always rotating in unison therewith, a reel and a cam on said reel for positioning said roller relative to said cone.

20. A measuring instrument having a stationary support, an oscillatable frame journaled thereon, a register on said frame, motor mechanism which includes two coöperating elements one of which rotates in proportion to the amount of rotation of said oscillatable frame about its axis, a variable speed gear for operating said register, said variable speed gear including a cone, a friction roller coöperating therewith, a slide in which said roller is journaled, said slide being movable relatively to said frame and a spiral cam operated by said reel for positioning said slide relatively to said frame to thereby adjust the roller relative to the cone, a register and a shaft geared to said register for operating it, said roller driving said shaft and being slidable lengthwise thereof.

21. A measuring instrument having a stationary support, an oscillatable frame journaled thereon, a flexible element, a reel on said frame for said flexible element, an arm extending radially from said frame, said wire passing through the end of said arm for thereby swinging the frame to accord with the direction of lead of the flexible element, a register, a variable speed gear for actuating said register, the velocity ratio depending upon the position to which the reel is rotated, and motor mechanism for driving said variable speed gear, said motor mechanism being actuated by said oscillatable frame in its rotation about its axis.

22. In an instrument for measuring areas, the combination of a stationary support, a swinging frame pivotally mounted in said support, a flexible element, a reel mounted in said swinging frame for supporting said flexible element, said flexible element engaging said frame at a point remote from the axis thereof for swinging said frame to an angle in accord with the lead of the wire, a register and mechanism for actuating said register, said actuating mechanism being acted upon both by the frame in its swinging movement about its axis and by the reel in its rotary movement about the reel axis.

23. An instrument for measuring areas having a stationary support, a swinging frame pivotally mounted on said support, a wire, a reel supported on said swinging frame for supporting said wire, an arm extending radially around said swinging frame, said arm being engaged by said wire, a register and means for actuating the register, said actuating means including a stationary wheel fastened to the stationary frame coaxially with the swinging frame, a wheel coöperating with said stationary wheel and rotated thereby when the frame is swung, a variable speed mechanism connecting the last mentioned wheel with the register for actuating the latter, and means operated by said reel for operating said variable speed mechanism.

24. An instrument for measuring areas having a stationary support, a swinging frame pivotally mounted on said support, a wire, a reel supported on said swinging frame for supporting said wire, an arm extending radially from said swinging frame, said arm being engaged by said wire, a register, and means for actuating the register, said actuating means including a stationary wheel fastened to the stationary frame coaxially with the swinging frame, a wheel coöperating with said stationary wheel and rotated thereby when the frame is swung, a cone rotated by the last mentioned wheel, a friction roller coöperating with said cone, and means operated by said reel for positioning said roller with regard to the distance of the reel from the apex of the cone.

25. An instrument for measuring areas having a stationary support, a swinging frame pivotally mounted on said support, a wire, a reel supported on said swinging frame for supporting said wire, an arm extending radially around said swinging frame, said arm being engaged by said wire, a register, and means for actuating the register, said actuating means including a stationary wheel fastened to the stationary frame coaxially with the swinging frame, a wheel coöperating with said stationary wheel and rotated thereby when the frame is swung, a cone rotating in unison with the last mentioned wheel, a friction roller coöperating with said cone, said roller being slidable along but always rotating with said shaft, a shaft connected to said register for operating it, a slide movable relatively to said swinging frame for shifting said roller along said shaft and along said cone, and a cam operated by said reel and capable of positioning said slide relatively to said swinging frame, substantially as described.

26. A measuring instrument comprising a stationary support, a swinging frame journaled in said support, a flexible element, a reel mounted in said frame for supporting said flexible element, said swinging frame engaging said flexible element at a point remote from the axis of the frame whereby a change in the direction of lead of the flexible element swings said frame about its axis, means for measuring the angle swept through by the frame, and other means for measuring the amount of rotation of the reel.

27. A measuring instrument comprising a stationary support, a frame journaled thereon, a flexible element, a reel for said flexible element mounted on said frame, said flexible element making sliding engagement with said frame at a point remote from the axis of the latter for swinging it about its axis, said stationary support having a pointer and said frame having a circular scale concentric with the frame and passing beneath said pointer transversely thereto whereby the operator may measure the angle which the frame is swept through by the change in direction of that part of the flexible element external to the instrument.

28. A measuring instrument comprising a stationary support, a swinging frame journaled in said support, a wire, a reel for said wire supported in said frame, said wire slidingly engaging said frame at a point remote from the axis of the frame for swinging it, a counterbalance weight for correcting the error due to the sag of the wire, and means for controlling the position of said weight, relatively to said frame.

29. A measuring instrument comprising a stationary support, a swinging frame journaled in said support, a wire, a reel for said wire supported in said frame, said wire slidingly engaging said frame at a point remote from the axis of said frame for swinging it, a counterbalance weight for correcting the error due to the sag of the wire, and a cam on said reel acting upon said counterbalance weight, for positioning it.

30. In a measuring instrument a stationary support, a swinging frame journaled in said support, an arm extending radially from said frame and having an eye therein, a wire, a reel for supporting said wire, said wire passing through said eye for swinging the frame to different angular positions, means for measuring the arc through which the frame is swung by the wire, a counterbalance weight, and a cam concentric with said frame and rotated by said reel and acting upon said counterbalance weight for controlling the position of said counterbalance weight.

31. In a measuring instrument a stationary support, a swinging frame journaled in said support, an arm extending radially from said frame and having an eye therein, a wire, a reel for supporting said wire, said wire passing through said eye for swinging the frame to different angular positions, means for measuring the arc through which the frame is swung by the wire, a counterbalance weight, a cam concentric with said frame and rotated by said reel and engaging said counterbalancing weight for controlling the position of said counterbalance weight, and means on the frame actuated by the reel for indicating the amount of wire unwound from the reel.

32. In a measuring instrument, the combination of a stationary support, a swinging frame journaled therein, a reel mounted in said frame co-axially therewith, a wire upon said reel passing through an aperture in said frame remote from the axis of the latter for swinging said frame about its axis, means for measuring the arc through which the frame is swung by the wire, a gear wheel fastened to the frame concentric with the axis of the frame, a companion gear wheel mounted upon the frame, a variable speed gear driven by said companion gear wheel, a register upon said frame for expressing area, said register being driven by said variable speed gear, a cam on said reel for varying the velocity ratio of said variable speed gear, and a counterbalance weight mounted on said frame and movable radially thereof, said counterbalance weight being moved to various positions by the aforesaid cam.

33. In a measuring instrument, the combination of a stationary support, a swinging frame journaled in said support and having an aperture remote from the center of the frame, a reel mounted in said frame, a wire on said reel passing through said aperture for swinging the frame about its axis, and means for measuring the amount of rotation of said reel, the turns of wire upon the reel being side by side whereby the amount of rotation imparted to the reel for a given length of wire unwound from the reel will remain constant for all parts of the wire.

34. An instrument for measuring areas by tracing part or all of the boundary thereof, said instrument having area-indicating means, a rotatable element, a stationary support therefor and a flexible, radially movable element, the end whereof may trace the boundary of the area to be measured, said indicating means being conjointly operated by said rotatable element and said radially movable element engaging said frame at a point remote from the axis thereof for rotating said frame when the radially movable element is moved laterally.

35. A measuring instrument having a register, a movable frame, a support for said frame, actuating means for driving said register, said actuating means being set in motion by the movement of said frame relative to its support, a flexible element, and variable speed mechanism operated by said flexible element for controlling the velocity ratio of said actuating means, said frame being moved relative to its support by said flexible element.

In witness whereof, I have hereunto subscribed my name in the presence of two witnesses.

JOHN AIREY.

Witnesses:
    JAMES P. BIRD,
    JOHN R. ALLEN.

Copies of this patent may be obtained for five cents each, by addressing the "Commissioner of Patents, Washington, D. C."